United States Patent [19]

Müller

[11] 4,017,781
[45] Apr. 12, 1977

[54] D.C. VOLTAGE CONVERTER

[75] Inventor: Peter Müller, Moosinning, Germany

[73] Assignee: Garching Instrumente Gesellschaft zur industriellen Nutzung von Forschungsergebnissen m.b.H., Garching, Germany

[22] Filed: July 30, 1975

[21] Appl. No.: 600,520

[52] U.S. Cl. .................................................. 321/2
[51] Int. Cl.² ........................................ H02P 13/22
[58] Field of Search ............. 321/2, 14, 18; 330/13; 307/235 R

[56] References Cited

UNITED STATES PATENTS

| | | | |
|---|---|---|---|
| 3,260,912 | 7/1966 | Gregory | 330/13 |
| 3,383,579 | 5/1968 | Hung | 321/14 |
| 3,816,809 | 6/1974 | Kuster | 321/2 |
| 3,859,583 | 1/1975 | Reed | 321/2 |
| 3,859,586 | 1/1975 | Wadlington | 321/14 |
| 3,870,943 | 3/1975 | Weischedel et al. | 321/2 |
| 3,873,903 | 3/1975 | Koetsch et al. | 321/2 |
| 3,909,696 | 9/1975 | Katou et al. | 321/2 |
| 3,916,282 | 10/1975 | Rothermol | 321/2 |
| 3,938,024 | 1/1975 | Clarke | 321/2 |

Primary Examiner—William H. Beha, Jr.
Attorney, Agent, or Firm—Edwin E. Greigg

[57] ABSTRACT

A D.C. to D.C. voltage converter for producing a regulated, adjustable D.C. output voltage from an unregulated D.C. input voltage. An inverter produces alternating rectangular output pulses from the unregulated D.C. input, which are rectified to produce the regulated D.C. output voltage, with the timing and duration of the inverter output pulses being determined by alternating rectangular control pulses produced by a control pulse generator.

The control pulse generator includes an operational amplifier having an inverting input connected to a positive D.C. reference voltage, and a non-inverting input connected to the slide connection of a potentiometer connected between the regulated positive D.C. output voltage and ground. A diode is connected between the amplifier output and ground to block current flow to ground, thus assuring that the amplifier output error signal is essentially always positive, and is only generated when the non-inverting input voltage exceeds the referenced voltage. Another operational amplifier is connected as an inverter to the output of the first amplifier to produce another equal, but negative, error signal. These two signals are combined in a threshold circuit with an alternating triangular wave voltage to produce alternating triangular pulses corresponding to the positive and negative portions of the triangular wave exceeding the positive and negative error signals. The triangular pulses are converted by a pulse shaping circuit into the alternating rectangular pulses which control the inverter switching circuits.

7 Claims, 5 Drawing Figures

D.C. VOLTAGE CONVERTER

D.C. voltage converters are known which contain an inverter to which an uncontrolled d.c. input voltage is applied, and which deliver an a.c. output voltage substantially in the form of square wave pulses which in turn are applied to an output rectifier. The d.c. voltage obtained from the output rectifier is compared with a reference voltage and the resultant error voltage is utilised to vary the length of the output pulses of the inverter set in a direction calculated to reduce the error signal. In conventional d.c. voltage transformation sets of this type the variation of pulse length is obtained by phase shift between two unipolar voltages. The control circuit is rather complicated and, when the output current or the output voltage is small, control is difficult.

A d.c. voltage converter in accordance with the present invention is as set forth in claim 1. Preferred forms of the invention are set forth in the subsidiary claims.

In its preferred form the invention provides a convertor for providing an adjustable and/or stabilized d.c. output voltage from an unstabilised d.c. input voltage, which is of simple construction and free from the defects referred to above. Thus the converter can be readily controlled down to zero, the output voltage does not substantially rise when the load is shed, and the set can be built up with cheap commercially available components. Moreover the present d.c. transformation set has a high efficiency (ratio of input to output).

One specific embodiment of the invention will now be described by way of example with reference to the accompanying drawings, in which.

Figure 1:
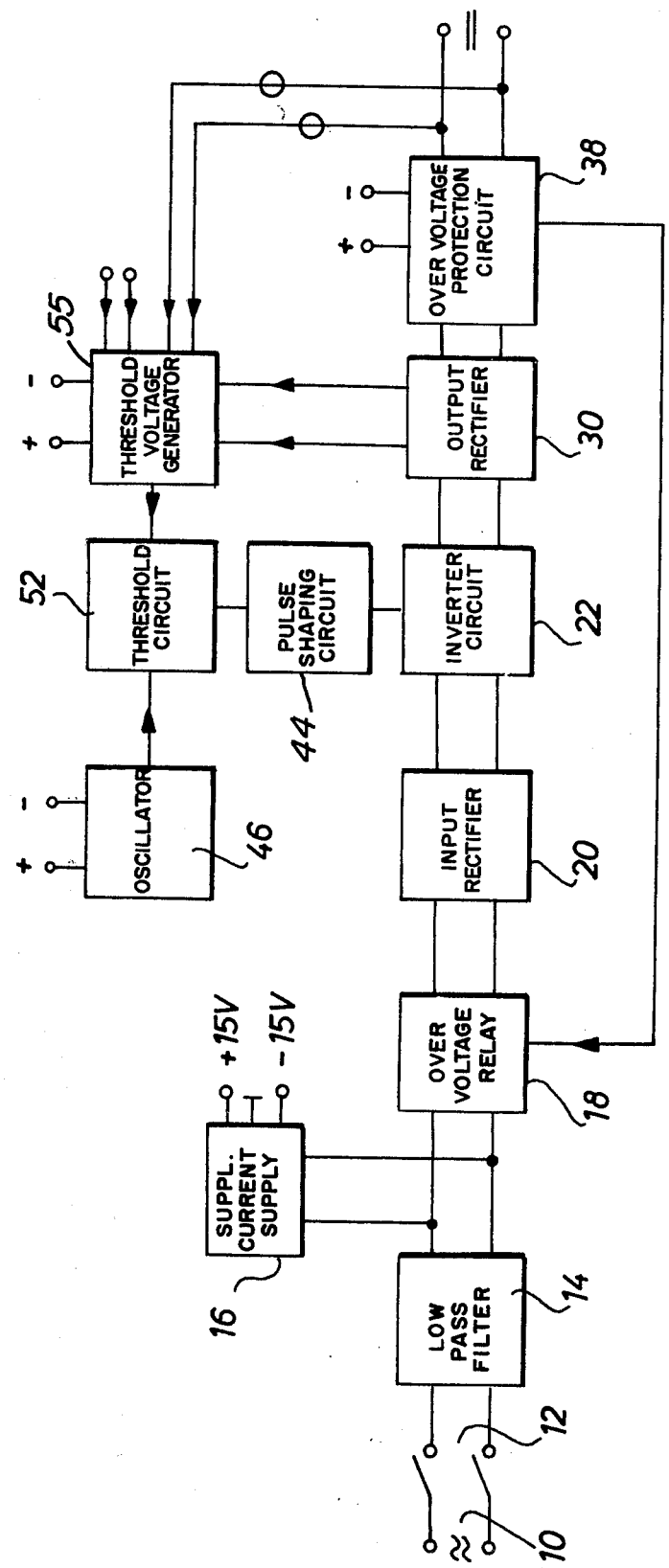
FIG. 1 is a block diagram illustrating the principle of a d.c. voltage converter supplied from mains.

FIG. 1 is a block diagram of a voltage converter designed to be supplied from an input a.c. voltage of for instance 220 volts and 50 c/s to provide a constant d.c. voltage which is adjustable from 0 to +5 volts. The maximum output current is 30 amps.

As shown in FIG. 1 the converter has input terminals 10 for connection to an a.c. mains supply. A switch 12 and a low-pass filter 14 connect these terminals on the one hand to a supplementary current supply unit 16 and on the other hand via the normally closed contact of an overvoltage relay 18 to an input rectifier set 20. The supplementary current supply unit 16 provides an operating voltage of say up to ±15 volts for the several amplifiers and so forth included in the controller etc of the transformation set. It contains a transformer with sufficient insulation between the primary and secondary windings for the operating voltages for the amplifiers and so forth to be completely isolated from the mains, i.e., so that they have no direct conducting connection to the a.c. input terminals 10.

Figure 2:
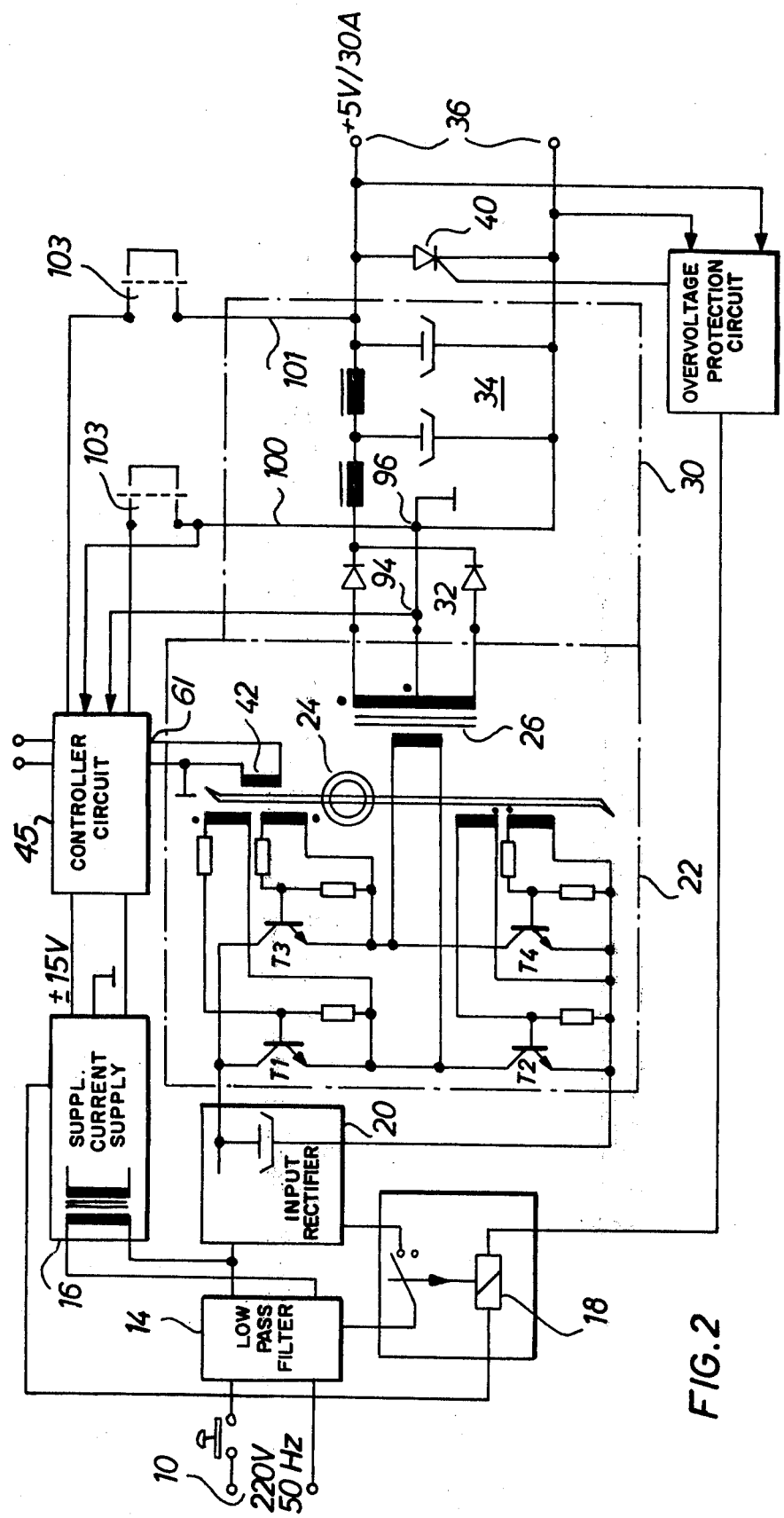
FIG. 2 is a detailed circuit diagram of the converter.

The input rectifier set 20 may be a conventional full-wave rectifier bridge containing four diodes and a following smoothing capacitor. It supplies an uncontrolled d.c. input to a switching circuit or external driven inverter circuit 22 which may be of conventional design. As shown in FIG. 2 this comprises four transistors $T_1$ to $T_4$ having their base circuits connected to four secondary windings of a toroidal transformer 24. These are arranged so that when a square wave control signal is supplied to a primary winding 42 of the transformer 24 each diagonal pair of transistors will switch on in alternate half cycles. The transistors are connected to form a fully controlled bridge inverter whose load is formed by the primary winding of an output transformer 26 (having a shell core) which has a centre tapped secondary winding across which a pulsed approximately square wave a.c. output voltage becomes available. This is taken to an output rectifier 30 comprising a full wave rectifier network 32 and a filter network 34. The output connections of the output rectifier 30 are taken to output terminals 36 where a d.c. output voltage becomes available.

The output terminals 36 are connected to an overvoltage protection set 38 which controls a silicon controlled rectifier (thyristor) 40 placed across the output terminals 36, and the overvoltage relay 18 which it operates as will be later described.

Figure 3:
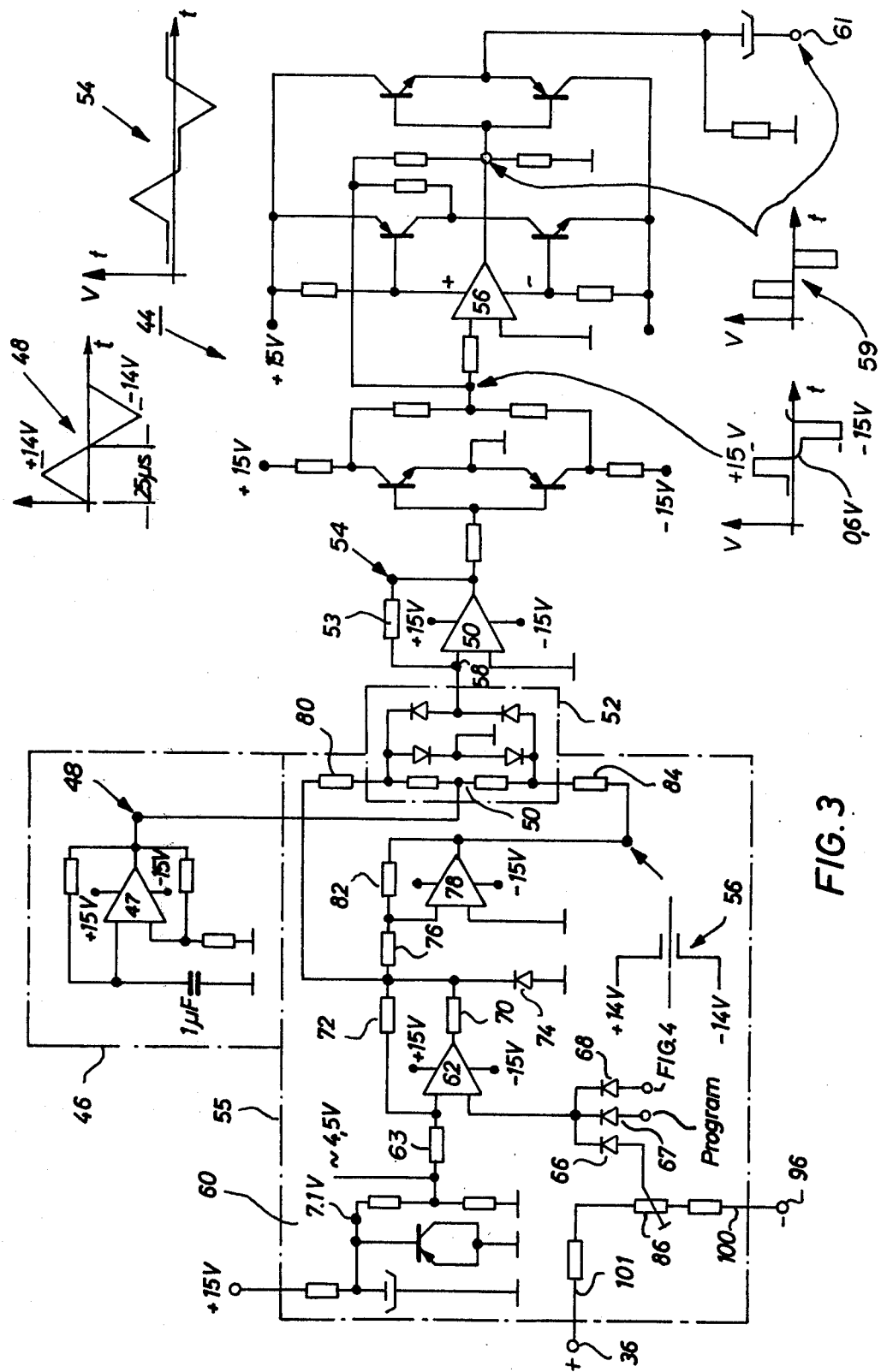
FIG. 3 is a circuit diagram of a controller incorporated in the converter of FIGS. 1 and 2.

The timing and duration of the alternating polarity pulses forming the a.c. output voltage of the inverter set 22 are determined by a pulsed substantially square wave control voltage which is applied to the primary winding 42 of the control transformer 24 by a controller 45 illustrated in FIG. 3.

As shown in FIG. 3 the controller 45 includes a free running oscillator 46 containing an operational amplifier 47 and generating a triangular wave control voltage substantially symmetrical about zero (ground voltage. The wave shape of this voltage is shown at 48. This triangular wave control voltage 48 is applied to the signal input 50 of a threshold circuit 52 which contains four diode rectifiers connected as shown in FIG. 3. The threshold circuit 52 is also supplied with two threshold voltages which are symmetrical with reference to ground (i.e., one being positive and one negative with respect to ground) and which are generated by a threshold generator 55 as illustratively indicated at 56. The output 58 of the threshold circuit is connected to one input of an operational amplifier 50 of which the other input is connected to ground. This operational amplifier is provided with a negative feedback resistor 53 so that it operates as a virtual-earth amplifier.

Thus if the instantaneous value of the oscillator output voltage 48 is positive it cannot pass current through the upper diode to the input of the amplifier 50 and will only pass current through the lower diode if it exceeds a certain proportion of the negative threshold voltage applied to the resistor 84. Similarly a negative oscillator voltage is blocked from the amplifier input by the lower diode and only applied through the upper diode when it exceeds a certain proportion of the positive threshold voltage applied to the resistor 80.

Thus at its output terminal 58 the threshold circuit 52 provides an output current in the form of triangular pulses corresponding to those parts of the a.c. control voltage 48 which rise above the positive threshold voltage 56 or fall below the negative threshold voltage. The amplifier 50 amplifies the output of the threshold circuit and the voltage of the amplified signal is illustrated at 54.

This output voltage 54 of the operational amplifier 50 is then applied to the pulse shaping circuit 44 which contains three clipping amplifier stages which transform the output voltage of the threshold circuit 52 into a control voltage 59 which has the form of square wave pulses of alternating polarity separated by intervals in which the voltage is zero, and which is taken from an output terminal 61 to the primary winding 42 of the control transformer 24 of the switching circuit 22. The construction of the pulse shaping circuit will be understood by referring to FIG. 3 and requires no further elucidation since it is in accordance with the state of the art. It should be sufficient to say that the triangular pulses from the operational amplifier 50 are rendered square in the pulse shaping circuit 44 by amplification and clipping and that the small voltage present between the triangular pulses which corresponds to the turn-on voltage of the diodes in the threshold circuit 52 is suppressed by a suitable bias and a resultant zero shift of one or more amplifying stages in the pulse shaping circuit 44.

The threshold voltage generator 55 contains a reference voltage circuit 60 which is connected to the positive output terminal (+15 volts) of the supplementary current supply unit 16, and which supplies a reference voltage $V_R$ of say 4.5 volts through a series resistor 63 to one of the inputs of an operational amplifier 62 of which the other input is connected in common to the cathodes of three diodes 66, 67 and 68. The output of the operational amplifier 62 is connected to ground via a resistor 70 and a diode 74 in series, so that the voltage at the junction of the resistor 70 and the diode 74 cannot fall below zero by more than the turn-on voltage of the diode. This junction is connected through a negative feedback resistor 72 to the input of the amplifier to which the reference voltage $V_R$ is connected, and also through a series input resistor 76 to the inverting input of another operational amplifier 78, whose non-inverting input is grounded. A negative feedback resistor 82 connects the output of the amplifier 78 to its inverting input. The positive and negtive threshold voltages are taken from the junction of the resistor 70 and the diode 74, and from the output of the operational amplifier 78, respectively.

The anode of the diode 66 is connected to the sliding contact of a potentiometer 86 of which the ends are connected each via a resistor to the output terminals 36. The purpose of the potentiometer 86 is to adjust the output voltage which is made available at the output terminals 36. Slight modifications in the reference voltage circuit 60 and the potential divider containing the potentiometer 86 enable a further ajustability range to be provided, more particularly extending down to zero voltage.

The diode 67 can be used to introduce a positive program control voltage which allows the output voltage at the terminals 36 to be adjusted independently of the control system. For example, by applying a positive voltage significantly above the reference voltage $V_R$ the output voltage appearing at the output terminals 36 can be reduced to 0, i.e., the output voltage can be switched off. This can be done abruptly or more or less progressively according to the variation of the program control voltage from a value corresponding to that at the potentiometer and a more positive voltage corresponding to an output voltage zero.

Figure 4:
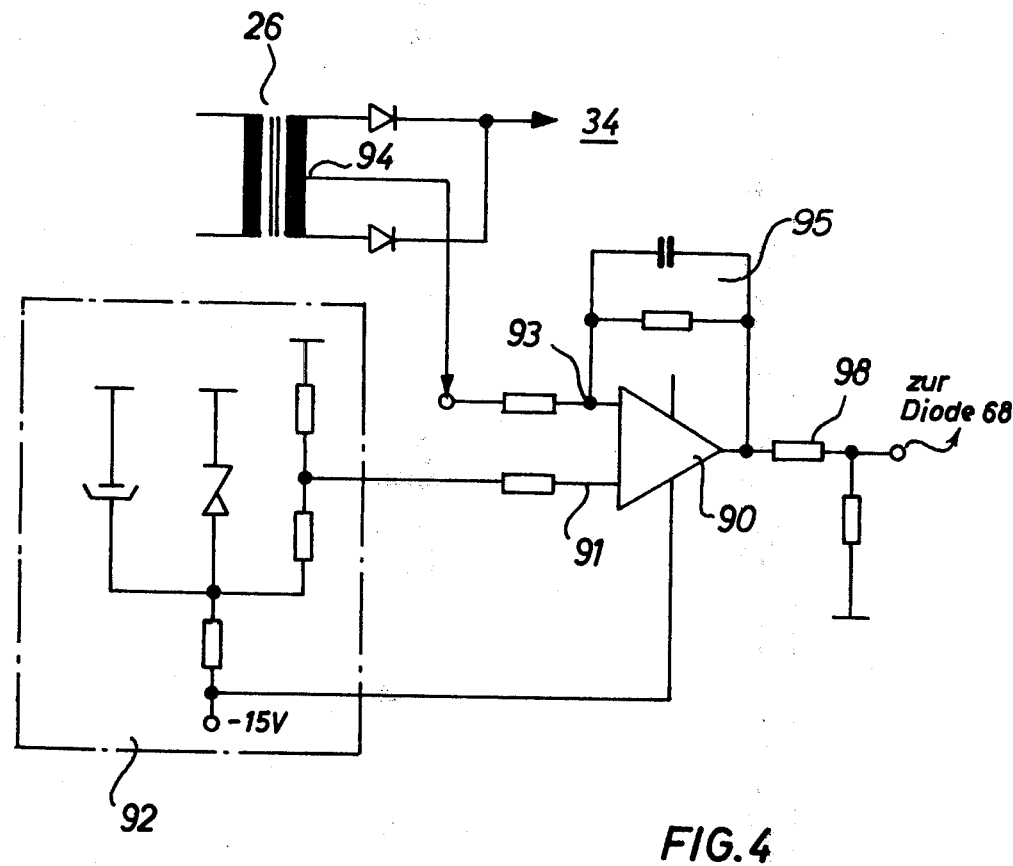
FIG. 4 is a circuit diagram of a current limiting circuit.

The diode 68 serves to inject a current limiting voltage which is provided by the current limiting circuit in FIG. 4. This current limiting circuit becomes operative as soon as the output current exceeds the rated current (in this instance 30 amps) in which case it reduces the output voltage sufficiently to prevent any significant increase in the output current. This current limiting circuit comprises an operational amplifier 90, a reference voltage being applied to one of its inputs 91 from a conventional reference voltage supply circuit 92 which is interposed between the negative output terminal of the supplementary current supply unit 16 and the ground and which supplies a stabilised reference voltage. A signal voltage is applied to the other input 93 from the centre tapping applied to the other input 93 from the centre tapping 94 (FIG. 2) of the secondary winding of the output transformer 26 of the inverter set 22. For the recognition of overcurrents use is thus made of the voltage drop which appears along a portion of the negative output line of the converter between the centre tap 94 and a point 96 at ground potential to which the potentiometer 86 of the potential divider is also connected.

The operational amplifier 90 has an RC negative feedback network 95 and its output is connected by a resistive potential divider 98 to the diode 68. When the output current rises the output voltage of the operational amplifer 90 becomes progressively more positive and electrical properties of the components are so calculated that this increasingly positive voltage begins to reduce the output voltage when the maximum permissible rated current is exceeded.

The connections 100, 101 between the output terminals 36 and potentiometer 86 may contain plug connectors 102 and 103 which permit the connections to be broken for the insertion of a so-called "feeler line," e.g., so that the control is in accordance with the actual voltage at the load rather than at the terminals of the converter. As known this is useful when a voltage is to be kept constant which is directly supplied to a user taking a considerable fluctuating current or when the voltage drop in the connecting lines between the user and the output terminals of the mains unit cannot be neglected.

Figure 5:
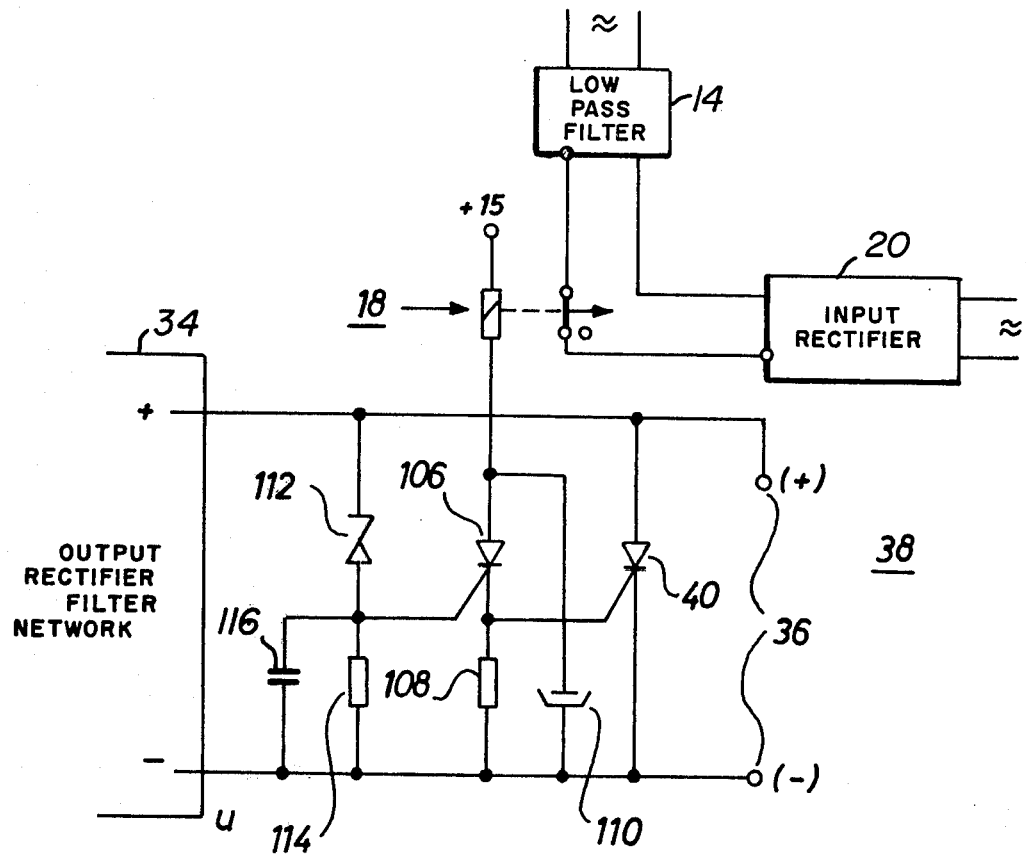
FIG. 5 is a circuit diagram of an overvoltage protection circuit.

When a feeler line is disconnected the control is no longer functional because instead of receiving the existing voltage, the diode 66 will receive a voltage which is either too positive or too negative. When the positive feeler line is interrupted the output voltage drops considerably, whereas it rises to the uncontrolled maximum voltage the d.c. voltage transformer is capable of supplying when the negative feeler line is interrupted. In order to prevent this from happening with a consequent possibility of damage at the user end an overvoltage protection set 38 is provided which is illustrated in greater detail in FIG. 5.

The overvoltage protection circuit 38 (FIG. 5) contains the previously mentioned silicon controlled rectifier 40. The gate of this rectifier is connected to the junction between the cathode of a second silicon controlled rectifier 106 and a resistor 18. The other end of the resistor 108 is connected to the negative output terminal. The anode of the silicon-controlled rectifier 106 is connected via a capacitor 110 to the negative output terminal and through the control winding of a relay 18 to the positive output terminal of the supplementary current supply unit 16 (FIG. 2). The gate of the silicon controlled rectifier 106 is connected to the junction between the cathode of a zener diode 112 and a resistor 114 which is by-passed by a capacitor 116. The other end of the resistor 114 is connected to the negative output terminal 36, whereas the other electrodes of the zener diode is connected to the positive output terminal 36.

As already mentioned the relay 18 contains a n.c. contact which is incorporated in the line between the low-pass filter network (i.e., the a.c. terminals 10) and the input rectifier 20, and which breaks this connection when the relay operates.

The overvoltage protection circuit 38 functions as follows: When the voltage between the output lines, i.e., across the output terminals 36, exceeds the permissible maximum limit, the silicon-controlled rectifier 106 is fired by the voltage drop across resistor 114. This results in the silicon-controlled rectifier 40 likewise firing and short circuiting the output terminals, besides energizing the relay 18 which will then disconnect the d.c. transformation set from the a.c. source, i.e., from the mains.

The described overvoltage protection circuit has the advantage that the silicon-controlled rectifier 40 need be designed only for a relatively low performance, since it is called upon to short circuit the full output voltage of the d.c. transformation set only for as long as is necessary to cause the relay 18 to operate. Since smaller silicon-controlled rectifiers have a more rapid response than silicon-controlled rectifiers for heavier duty, the described overvoltage protection set has the additional advantageous feature of providing a high speed response.

What I claim is:

1. A D.C. to D.C. voltage converter for producing a regulated, adjustable D.C. output voltage from an unregulated D.C. input voltage, which comprises:
    an inverter means for producing alternating rectangular output pulses from the unregulated D.C. input voltage wherein the timing and duration of said inverter output pulses are determined by alternating rectangular control pulses;
    rectifier means for producing said regulated D.C. output voltage from said inverter output pulses; and
    control pulse generating means for producing said control pulses wherein the duration of said control pulses is determined by said regulated D.C. output voltage to stabilize same,
    characterized in that said control pulse generating means includes:
        means for generating a D.C. reference voltage;
        first operational amplifier means, having an inverting input, a non-inverting input, and an output, for comparing at least a portion of said regulated D.C. output voltage with said reference voltage to produce an error voltage.
        means for producing a positive and a negative threshold voltage, each proportional to said error voltage;
        oscillator means for generating an alternating, triangular wave voltage;
        a first threshold circuit means for combining said triangular wave voltage with said positive threshold voltage to produce positive signal pulses corresponding to positive portions of said triangular wave exceeding said positive threshold voltage;
        a second threshold circuit means for combining said triangular wave voltage with said negative threshold voltage to produce negative signal pulses corresponding to negative portions of said triangular wave exceeding said negative threshold voltage;
        means for combining said positive and negative signal pulses to produce alternating triangular signal pulses; and
        pulse forming means for converting said alternating triangular signal pulses into said alternating rectangular control pulses.

2. A D.C. to D.C. voltage converter, as described in claim 1, wherein said first operational amplifier means includes:
    means for applying said at least a portion of said regulated D.C. output voltage to said non-inverting input; and
    means for applying said reference voltage to said inverting input.

3. A D.C. to D.C. voltage converter, as described in claim 2, which further comprises means coupling said non-inverting input of said first operational amplifier means to a current limiting circuit.

4. A D.C. to D.C. voltage converter, as described in claim 2, which further comprises means coupling said non-inverting input of said first operational amplifier means to a program control signal input.

5. A D.C. to D.C. voltage converter, as described in claim 2, which further comprises means for adjusting said at least a portion of the D.C. output voltage to thereby adjust said D.C. output voltage.

6. A D.C. to D.C. voltage converter, as described in claim 5, wherein said reference voltage and said regulated output voltage are of the same polarity relative to ground, and which further comprises diode means connected between the output of said first operational amplifier means and ground, to essentially limit said error voltage to a D.C. voltage of the same polarity as said reference voltage and said regulated output voltage.

7. A D.C. to D.C. voltage converter as described in claim 6, wherein said error voltage is one of said threshold voltages, and said threshold voltage generating means includes a second operational amplifier means, having an inverting input connected to the output of said first operational amplifier means, a non-inverting input connected to ground, and an outlet for producing the other of said threshold voltages.

* * * * *